United States Patent [19]

von Plessen et al.

[11] 3,972,987

[45] Aug. 3, 1976

[54] PROCESS FOR REGENERATING SULFURIC ACID

[75] Inventors: Helmold von Plessen, Kelkheim, Taunus; Siegfried Schiessler, Frankfurt am Main, both of Germany

[73] Assignee: Hoechst Aktiengesellschaft, Frankfurt am Main, Germany

[22] Filed: Dec. 4, 1974

[21] Appl. No.: 529,520

[30] Foreign Application Priority Data

Dec. 6, 1973   Germany............................ 2360706

[52] U.S. Cl................................... 423/523; 203/28; 423/531
[51] Int. Cl.² ...................... C01B 17/90; B01D 3/34
[58] Field of Search ........... 423/523, 525, 526, 527, 423/529, 531; 203/12, 28, 81; 210/73; 134/12, 13

[56] References Cited

UNITED STATES PATENTS

| | | | |
|---|---|---|---|
| 1,795,995 | 3/1931 | Busching............................ | 423/531 |
| 2,134,909 | 11/1938 | De Nooji et al. .................... | 423/531 |
| 2,313,910 | 3/1943 | Archibald............................ | 423/525 |

FOREIGN PATENTS OR APPLICATIONS

| | | | |
|---|---|---|---|
| 66,665 | 4/1948 | Denmark............................ | 423/531 |
| 299,774 | 8/1915 | Germany............................ | 423/531 |
| 651,048 | 5/1933 | Germany............................ | 423/531 |
| 1,143,492 | 2/1963 | Germany............................ | 423/531 |
| 483,821 | 4/1938 | United Kingdom................. | 423/531 |
| 171,684 | 5/1923 | United Kingdom................. | 423/531 |

*Primary Examiner*—Oscar R. Vertiz
*Assistant Examiner*—Gary P. Straub
*Attorney, Agent, or Firm*—Curtis, Morris & Safford

[57] ABSTRACT

Two-step-process for regenerating dilute sulfuric acid which may contain organic and inorganic impurities such as heavy metal salts. In the first step the impure acid is distilled in vacuo and in the second step concentrated in a Pauling apparatus.

21 Claims, No Drawings

PROCESS FOR REGENERATING SULFURIC ACID

A number of processes have been used successfully in industry for the technically important working up of diluted sulfuric acid. Especially for concentrating higher per cent acids the concentration process in outside heated vessels with a mounted dephlegmator according to Pauling or the concentration by direct contact with hot gases have been used for a long time. Difficulties may however appear in these processes, if the sulfuric acid contains besides water and gaseous components further impurities. Organic substances among said impurities such as, for example, up to 2 % by weight aromatic compounds resulting from the nitration of benzene or naphthaline derivatives are generally eliminated in the regeneration process by distillation or oxidation. Mineral salts such as, for example copper, iron, ammonium, alkaline earth metals and sodium sulfates are, however, removed only partially in the process. When reusing the concentrated acid certain mineral salts may accumulate in the acid rendering impossible a repeated use of the regenerated acid for the same purpose. It was therefore desirable to transform a water-containing sulfuric acid having a content of mineral salts and/or organic impurities into a pure and concentrated sulfuric acid.

A process has now been found for regenerating impure water-containing 70 to 90 % sulfuric acid, which comprises distilling the impure water-containing sulfuric acid in vacuo, in usual manner, drawing off the bottom product of the distillation continuously or discontinuously and concentrating the condensate obtained in known manner to a sulfuric acid content of from 96 to 97 % in a Pauling installation. For carrying out the distillation the aqueous impure sulfuric acid is introduced continuously into a receiving volume of concentrated sulfuric acid, which is maintained at a sufficiently high temperature to sustain the distillation, i.e. at a temperature above the boiling point of the impure sulfuric acid.

The Pauling installation, i.e. concentrator according to German Patent No. 299,774 (1915) consists of an outside heatable vessel provided with a mounted dephlegmator, i.e., fractionation column. The Pauling apparatus and process are described in applicants copending application Ser. No. 478,631, filed June 12, 1974 on page 2, lines 3 to 26, wherein it is stated that in the Pauling process, sulfuric acid containing at least 70 weight % of pure acid is passed through a dephlegmator mounted on a vessel having a sufficient capacity and made from cast iron, heated by means of gas, which dephlegmator is provided with partitions of a ceramic packing. Hot vapors rise from the boiling contents of the vessel to meet the cool dilute acid flowing downward; the vapors ascending in the dephlegmator absorb more and more steam from the descending cold dilute acid and simultaneously dissipate large amounts of their heat capacity to the acid. The dilute acid, while passing through the dephlegmator, is thus, concentrated to about 90 weight percent, starting from about 70 weight percent. Concentrated, about 96 percent sulfuric acid is discharged from the constantly boiling contents of the vessel in the same amount in which the dilute acid is fed in via the dephlegmator, and cooled.

The Pauling apparatus and process are also described in Ullmann, Encyclopedia der technischen Chemie, 3rd Ed., Vol. 15, at pages 443 – 444, a translation of a portion of which states: The Pauling process is carried out under normal pressure and with indirect heating. The apparatus consists of a vessel made of cast iron having a capacity of 5 m$^3$, around which flew gas is circulated, and a rectifying column standing on the cover of the vessel, which column is made of steel or cast iron with acid-proof masonry lining, has a height of 3m and a diameter of 400 mm and is charged with Raschig rings. The 68 to 70 percent sulfuric acid to be concentrated flows from the rectifying tower into the vessel. The sulfuric acid contained in the vapors is thus condensed, and the acid is preconcentrated to 82 to 85%. The vapors escaping from the rectifying tower have a temperature of about 120° to 140°C when leaving; they contain only traces of acid and are collected in a little condenser made of lead and charged with Raschig rings. In the vessel, the acid has to be maintained at a minimum of 96% (boiling point 330°C) in order to prevent the cast iron from being damaged. A vessel having a heating area of about 10 m$^2$ square concentrates about 14 tons of acid per day from 68 to 96%. A vacuum of about 5 to 12 torrs, preferably from 8 to 12 torrs must be maintained during the distillation so that a temperature of up to 200°C is produced in the distilling vessel. Tantalum, acid resistant nickel alloys, iron silicides or linings of silicate nature, for example, are practically corrosion-resistant against sulfuric acid at the cited temperature and may, consequently, be used as material for the distilling apparatus. In order to reduce the energy demand in the process the distilling vapor mixture of sulfuric acid and water may be partially condensed as specified, for example, in Chemical Engineers Handbook, 4th edition, 1963, chapter 13, page 21 or in German Offenlegungsschrift No. 2,257,037. A product having a higher content of $H_2SO_4$ than the crude acid used for the distillation is obtained by this method. Thereafter the obtained distilled acid is concentrated up to a content of from 96 to 97 % of $H_2SO_4$ in a conventional Pauling apparatus and process consisting for example of a boiling vessel made from acid-resistant cast iron and a dephlegmator, for example, made from 15 % silicium cast iron.

The organic impurities contained in the diluted acid used for the distillation react in a different way during the distillation: they may be decomposed oxydatively while forming $CO_2$ and $H_2O$. The decomposition may be supported by adding for example from 0.1 to 5 % of nitric acid or of hydrogen peroxide; when using nitric acid nitrogen and nitrose gases are formed. Organic components of the crude acid are often decomposed giving elementary carbon, which remains in the bottom product of the distillation and colors it dark. The carbon formed may be drawn off continuously or discontinuously with the bottom product of the distillation. The organic impurities of the waste acids such as aromatic mono-and/or polycarboxylic acids, for example phthalic acid may as well distill with the sulfuric acid and be found in the distillate. These admixtures may be removed in known manner in the following concentration process according to Pauling, for example, by adding from 0.1 to 5 % by weight of nitric acid. The content of organic impurities of the diluted sulfuric acid used for the distillation should not surpass about 2 % of carbon advantageously. A considerable part of the carbon-containing impurities is already removed at the end of the first stage.

By adding 5- and/or 3-valent positive nitrogen to the crude acid during the distillation (for example in the form of nitric acid or nitrosylsulfuric acid) the ammonium sulfate contained in the sulfuric acid may be decomposed while forming elementary nitrogen. The required quantity of nitric acid or nitrosylsulfuric acid depends as well on the quantity of organic substances as on the quantity of nitrogen containing compounds (for example acid amides of nitriles) capable of forming ammonium sulfate during the decomposition in the hot sulfuric acid. The quantity of the addition must be determined experimentally for each case, for example, by a series of tests with increasing amounts of additives. If the dosage is too high it must be taken into account that nitrogen compounds in the form of nitrose are to be found in the distilled sulfuric acid. If said compounds should be disadvantageous for the intended use of the sulfuric acid, they may be eliminated in known manner (cf. U.S. Pat. Nos. 2,355,702 and 2,971,819) prior, or if necessary, after the Pauling process.

Sulfuric acid containing aromatic mono- and/or polycarboxylic acids as well as light and/or heavy metal ions may be regenerated by the described process according to the invention. Organic nitrogen compounds as well as ammonium ions may be present additionally, the ammonium ions being optionally formed during the heating process.

The described process may be improved in many cases by treating the impure sulfuric acid prior to distillation with 0.1 to 5 % by weight of an inert absorbent auxiliary such as active carbon, bleaching earth, diatomaceous earth and by filtering it subsequently. A crude acid containing 0.1 % of C, 0.4 % of N, 0.06 % of Cl and 0.18 % of Cu could be purified by treating it with a mixture of 0.5 % of active carbon and diatomaceous earth each to such a degree that 0.6 % of C, 0.2 % of N, 0.03 % of Cl and 0.077 % of Cu could only be detected after filtration. Adding from 0.1 to 5 % by weight of nitric acid to the crude diluted sulfuric acid or to the sulfuric acid treated with the above-mentioned absorbent substances, heating for a short time, stirring and/or keeping the sulfuric acid at room temperature prior to distillation also favors the purification process. These pretreatments generally improve the color of the mostly dark colored crude acid and reduce the quantity of the impurities, for example, of the organic compounds of the acid. By admixing a sufficiently great quantity of nitric acid to the sulfuric acid during the pretreatment, approximately according to the equation: % $HNO_3 = 6 \times$ % by weight of N (N determined according to Kjeldahl), a part of the ammonium sulfate already present or formed by decomposition is eliminated while forming nitrogen at the latest during the distillation.

The heavy or light metal sulfates, for example, of copper, iron, the alkaline earth or alkali metals remaining in the bottom product of the distillation especially the Cu and Fe sulfates accumulate while precipitating partly. Said precipitating metallic sulfates may be collected uniformly and separated by means of a settling vessel connected to the distilling vessel by a small passage. Such a settling vessel is shown, for example, in German Patent Specification No. 299,774. The bottom product of the distillation formed may be drawn off continuously or discontinuously. In the case of a low content of impurities, for example, of alkali metal sulfates or of elementary carbon formed by the decomposition of organic compounds and accumulating in the bottom product, the bottom product must only be drawn off after some time.

In order to remove the organic impurities in the Pauling process, long residence times (10 to 15 hours) are often required for the boiling of concentrated sulfuric acid, requiring big vessels and increasing the wearing. In the process according to the invention shorter residence times for the sulfuric acid in the Pauling stage are required owing to the fact that a complete decomposition of carbon or of organic compounds by oxidation is obtained by the two-stage heat-treatment of the impurified sulfuric acid, even in the case of shorter residence times.

The Pauling stage in the process according to the invention may, consequently, be effected using a small boiling vessel, with a high output of acid. Moreover, sensitive materials such as quartz ware or glass may be used for said vessels.

Compared to the next comparable process for concentrating sulfuric acid described in German Patent Specification No. 1,143,492 the process according to the invention is distinguished by the fact that dissolved mineral salts from the impure sulfuric acid may be separated and that said salts accumulate in a small quantity of the concentrated acid only so that their elimination or working up, for example, according to German Patent Specification No. 1,141,985, is rather facilitated.

What is claimed is:

1. A process for regenerating contaminated 70 to 90% by weight sulfuric acid containing water, which comprises distilling said contaminated sulfuric acid at a pressure of 5 to 12 torrs, condensing the distilling vapors containing sulfuric acid and water, withdrawing non-volatile distillation bottoms products; and concentrating the distillation condensate in a Pauling apparatus comprising a dephlegmator and a vessel, said vessel containing 96 to 97% by weight sulfuric acid, by heating said vessel to maintain the sulfuric acid at a boiling temperature, feeding said distillation condensate to the dephlegmator, stripping water from the condensate and concentrating the sulfuric acid in the vessel up to 96 to 97% by weight.

2. The process of claim 1 in which the contaminated sulfuric acid contains aromatic mono-and/or polycarboxylic acids and light and/or heavy metal salts thereof as impurities.

3. The process of claim 1 which comprises carrying out the distillation at a temperature of up to 200°C.

4. The process of claim 1 in which the distillation is carried out at a pressure of from 8 to 12 torrs.

5. The process of claim 1 in which the contaminated sulfuric acid is contacted with an inert absorbent prior to distillation.

6. The process of claim 5 in which 1 to 5% by weight of absorbents are added to the contaminated acid.

7. The process of claim 1 in which the contaminated sulfuric acid contains up to 2% by weight of organic impurities, based on carbon content.

8. The process of claim 1 in which the contaminated sulfuric acid contains aromatic mono and/or polycarboxylic acid impurities.

9. The process of claim 1 in which the contaminated sulfuric acid contains organic nitrogen compound impurities.

10. The process of claim 1 in which the contaminated sulfuric acid contains light and/or heavy metal salt impurities.

11. The process of claim 10 which comprises, during the distillation and condensing of the sulfuric acid, precipitating in the distillation apparatus and separating from the distillation bottoms heavy metal sulfate precipitates.

12. The process of claim 1 in which the contaminated sulfuric acid contains ammonium ions or forms ammonium ions during the distillation step.

13. The process of claim 1 which comprises adding to the contaminated sulfuric acid inorganic, positive 3 and/or 5 valent nitrogen compounds.

14. The process of claim 1 which comprises adding to the contaminated sulfuric acid 0.1 to 5% by weight of nitric acid or hydrogen peroxide.

15. The process of claim 1 which comprises continuously introducing the contaminated sulfuric acid into a volume of boiling sulfuric acid in the distillation apparatus, continuously distilling and condensing water and sulfuric acid, and continuously feeding the distillation condensate to the dephlegmator portion of the Pauling apparatus and continuously withdrawing 96 to 97% concentrated sulfuric acid from the vessel portion of the Pauling apparatus.

16. The process of claim 1 in which the contaminated sulfuric acid contains aromatic mono-and/or polycarboxylic acids, organic nitrogen compounds and light and/or heavy metal and ammonium salts thereof as impurities.

17. A process for regenerating contaminated aqueous 70 to 90% by weight sulfuric acid containing up to 2% by weight organic impurities, based on carbon content, selected from the group consisting of aromatic mono- and polycarboxylic acids, organic nitrogen compounds and salts of light and/or heavy metal ions and ammonium ions, which comprises adding about 1 to 5% by weight nitric acid to the contaminated sulfuric acid, distilling the contaminated acid in a distillation apparatus, at a pressure of 5 to 12 torrs and at a temperature of up to 200°C, condensing the distillation vapors which contain water and sulfuric acid, withdrawing nonvolatile distillation bottoms products, feeding the distillation condensate to the dephlegmator portion of a Pauling apparatus, which apparatus comprises a vessel portion containing 96 to 97% by weight boiling sulfuric acid, stripping water from the condensate and concentrating the condensate sulfuric acid in the vessel portion up to 96 to 97% sulfuric acid.

18. The process of claim 17 in which the contaminated sulfuric acid contains impurities selected from the group consisting of copper, iron, ammonium, alkaline earth metal and alkali metal sulfates.

19. The process of claim 17 in which 0.1 to 5% by weight nitric acid is added to the contaminated sulfuric acid.

20. The process of claim 17 in which the organic impurities comprise phthalic acid.

21. The process of claim 17 in which organic impurities are decomposed to elemental carbon during the distillation step.

* * * * *